(12) United States Patent
Root et al.

(10) Patent No.: US 6,334,654 B1
(45) Date of Patent: Jan. 1, 2002

(54) INTEGRATED TRAIN ELECTRICAL AND PNEUMATIC BRAKES

(75) Inventors: Kevin B. Root, Black River; Bryan M. McLaughlin, Watertown; Dale R. Stevens, Adams Center; Jon M. Marra, Henderson, all of NY (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 09/397,676

(22) Filed: Sep. 16, 1999

Related U.S. Application Data

(63) Continuation-in-part of application No. 09/254,638, filed on Nov. 23, 1999, now Pat. No. 6,098,006, which is a continuation-in-part of application No. PCT/US98/23766, filed on Nov. 10, 1998.
(60) Provisional application No. 60/065,064, filed on Nov. 10, 1997, and provisional application No. 60/026,039, filed on Sep. 13, 1996.

(51) Int. Cl.[7] .............................................. B60T 13/74
(52) U.S. Cl. ................... 303/7; 303/3; 303/15; 303/20
(58) Field of Search ............................ 303/7, 15, 20, 303/3

(56) References Cited

U.S. PATENT DOCUMENTS

| 4,652,057 A | | 3/1987 | Engle et al. |
| 5,538,331 A | | 7/1996 | Kettle, Jr. |
| 5,721,683 A | * | 2/1998 | Joyce, Jr. et al. ............. 303/25 |
| 5,862,048 A | * | 1/1999 | Knight ........................ 303/15 |
| 5,984,427 A | | 11/1999 | Kettle, Jr. |

* cited by examiner

Primary Examiner—Robert J. Oberleitner
Assistant Examiner—Robert A. Siconolfi
(74) Attorney, Agent, or Firm—Barnes & Thornburg

(57) ABSTRACT

An integration train brake system including a single brake controller providing locomotive and train brake commands. A first control transmits a car brake signal on an electrical network for train brake commands to EP cars. A second control transmits a locomotive brake signal on the locomotive brake pipe for train and locomotive brake commands. The brake system may have a pneumatic mode and an electrical mode. The first control transmits car brake signals on the network in the electrical mode and the second control transmits car brake signals on the train brake pipe for the pneumatic mode. The second control transmits locomotive brake signals on the locomotive brake pipe in either mode. If the train is all electropneumatic, cars and locomotive braking signals are provided on the network. Distributive power may also be transmitted over the network in the electrical mode.

58 Claims, 9 Drawing Sheets

US 6,334,654 B1

INTEGRATED TRAIN ELECTRICAL AND PNEUMATIC BRAKES

CROSS-REFERENCE

This application is a continuation-in-part of PCT application US98/23766 filed Nov. 10, 1998 which claims priority of U.S. Provisional Application No. 60/065,064 filed Nov. 10, 1997 and which is incorporated herein by reference and also, a continuation-in-part of appl. Ser. No. 09/254,638, filed Nov. 23, 1999, now U.S. Pat. No. 6,098,006 which claims priority to Provisional Application No. 60/026,039 filed Sep. 13, 1996 and of which is incorporated herein by reference, stemming from PCT/US97/13697 filed Sep. 12, 1997.

BACKGROUND AND SUMMARY OF THE INVENTION

The present invention relates generally to electrically controlled pneumatic train brakes and computer controlled train brake systems, and more specifically, to the integration of the two systems.

Computer controlled brake systems are well known as exemplified by CCBI and CCBII available from New York Air Brake Corporation. These systems provide computer control of the pneumatic control unit for the pneumatic pipes running throughout the train. This allows pneumatic control of the locomotive as well as the individual car brakes. More recently, the industry has been striving to provide electrically controlled pneumatic brakes on each of the cars. This has led to the electrically controlled pneumatic ECP system which is independent of the computer control braking system. An overview of such a system is EP-60 available from New York Air Brake Corporation.

As presently implemented, the ECP system in the locomotive runs in parallel to that of the conventional pneumatic locomotive train controls. Two brake valves are provided, one being the brake valve for the pneumatic braking and the other being the ECP brake valve. Similarly, separate displays are provided for each system. The locomotive or the consist of the locomotives does not respond to the brake commands made by the ECP system since the locomotives respond to pneumatic signals on pipes. Also, the ECP system has its own discreet input from the event recorder and from the locomotive controls to determine penalties.

With the implementation of electrically controlled pneumatic brakes, there has also been discussion of the desirability of integrating the computer controlled braking systems with the electrical controlled pneumatic brake systems.

The present system provides such integration of a brake system for a train which includes a train brake pipe extending through locomotives and cars in the train, a locomotive brake pipe extending through adjacent locomotives, pneumatic brakes on the locomotive connected to the locomotive brake pipe and electropneumatic brakes on the cars connected to the brake pipe and an electrical network. Electropneumatic brakes on the locomotive are also connected to the electrical network. The system includes a single brake controller providing locomotive and train brake commands. A first control is connected to the brake controller and transmits a car brake signal on the network for train brake commands. A second control is connected to the brake controller and transmits a locomotive brake signal on the locomotive brake pipe for train and locomotive brake commands.

The brake system may have a pneumatic mode and an electrical mode. The first control transmits car brake signals on the network in the electrical mode and the second control transmits car brake signals on the train brake pipe for the pneumatic mode. The second control transmits locomotive brake signals on the locomotive brake pipe in either mode. The brake system's default is the pneumatic mode.

The controller provides a system initiated emergency brake command or an operator initiated emergency brake command. The first control transmits an emergency brake signal on the network for system and operator initiated emergency brake commands. The second control transmits an emergency brake signal on the train and locomotive brake pipes for operator initiated and pneumatic system emergency brake commands. The brake controller has a lead or trail mode and provides the brake command signals only in the lead mode.

If the locomotive consist includes a locomotive having electropneumatic brakes on the electrical network, the first control transmits the locomotive brake signals on the network for train and locomotive brake commands. The second control continues to transmit locomotive brake signals on the locomotive brake pipe for those locomotives that do not have electropneumatic brakes. The train and/or locomotive brake signals on the network are transmitted as a percentage of brake signals.

The controller also provides penalty brake commands. The first control transmits a penalty brake signal on the network for a penalty brake command. If the controller determines that a suppression of the brake command occurs during a penalty brake command, the controller does not provide a penalty brake command signal. The controller also provides a cutoff train propulsion signal for penalty brake commands.

If the train includes only electropneumatic brakes on the locomotives and the cars, the first control transmits car brake signals on the network for train and locomotive brake commands. For an emergency, the car and locomotive brake commands are sent on the network and a second control provides a brake signal on the train brake pipe.

Upon powerup or default, the brake system is set in pneumatic mode. Pneumatic mode set up is performed following by electrical mode set up, if the electrical mode is selected. If the system includes a distributive power system, the distributive power system set up is completed after the electrical mode set up. With the distributive power system, brake signals are transmitted on the train brake pipe and power signals are transmitted using a radio when the train is operated in the pneumatic mode. Brake signals and power signals are transmitted on the network when the train is operated in the electrical mode.

The controller includes an operator control providing operator brake signals. In the electrical mode, the controller provides the operator brake commands to the first control. The first control transmits the locomotive car brake signals on the network and locomotive brake signals back to the controller. The controller provides the locomotive brake signals to the second control and the second control applies the brakes of the locomotive. In the pneumatic mode, the control provides the operator brake commands to the second control and the second control transmits the car brake commands on the train brake pipe and applies the brake of the locomotive. Where a locomotive brake pipe is available, the second control provides locomotive brake signals on the locomotive brake pipe in both modes. A non-transmitting first control, upon receipt of the locomotive brake signal in the network, provides the locomotive brake signal to its controller. Its controller then provides the locomotive brake signal to its second control and the second control applies the brakes of the locomotive. The first control resets the network for pneumatic and electrical systems and an operated initiated emergency brake commands. The controller resets the second control for pneumatic system and operator initiated emergency brake commands.

The controller provides a penalty brake command and the first control transmits the car penalty brake signal on the network for a penalty brake command. The first control also acknowledges to the controller that has transmitted a penalty brake signal. The controller sends an emergency brake command to the second control if the penalty acknowledge is not received. An integrated locomotive computer is connected to and interfaces the controller and the first control to the locomotive systems. These systems could include, for example, the distributive power system.

A method is also described for carrying out the integration of functions.

Other objects, advantages and novel features of the present invention will become apparent from the following detailed description of the invention when considered in conjunction with the accompanying drawings.

DETAILED DESCRIPTION OF THE PREFERRED EMBODIMENT

Although the present brake system will be described using EP-60 electropneumatic train brake system and CCBI/CCBII computer controlled locomotive brake system as an example of two systems which may be integrated, the present integrated system can be implemented using other similar pneumatic and electropneumatic systems for train and locomotive brake controls.

Figure 1:
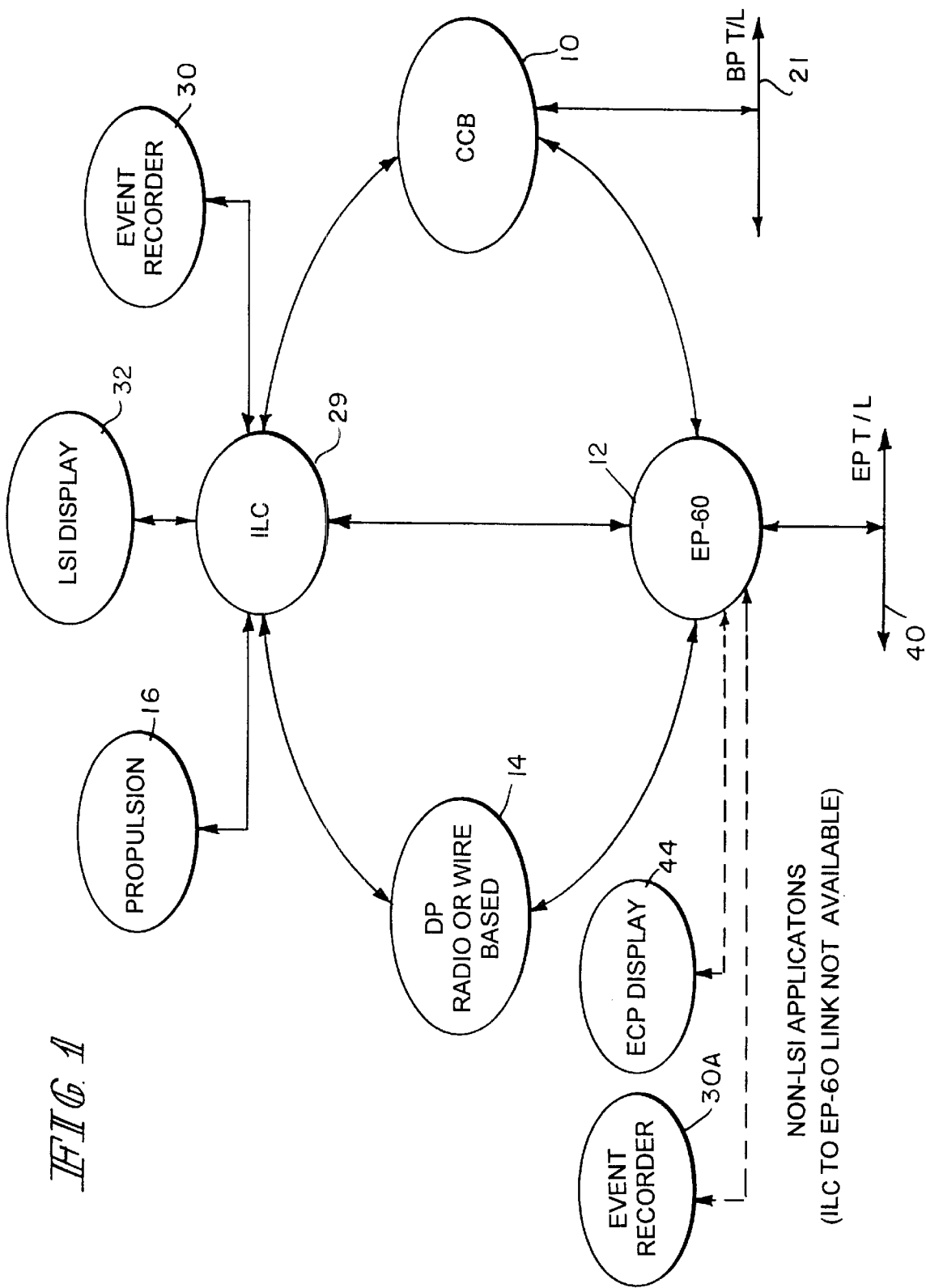
FIG. 1 is a diagram of the architecture of an integrated train electrical and pneumatic brake system for a locomotive system integration LSI and non-locomotive system integration applications.

An overview of the system architecture is illustrated in FIG. 1. A computer controlled locomotive brake system 10 is illustrated as a CCB. It controls the brake pipe train line 21. It is connected to an electropneumatic train brake system 12, which is illustrated as an EP-60 and controls an electropneumatic trainline 40. An integrated locomotive computer (ILC) 29 is connected to the CCB 10 and the EP-60 12.

A distributor power system DP 14 is also provided and connected to the ILC 29. The ILC 29 is also connected to a propulsion system 16 and transmits information to the event recorder 30. An LSI display 32 is also connected to the ILC 29.

For non-locomotive system integration applications, namely where the ILC link to the EP-60 12 is not provided, an operator interface unit or ECP display 44 is provided and connected to the EP-60 and a separate event recorder 30A is connected to the EP-60. The event recorder 30 may be a separate and distinct device or integrated into the ILC 29. If it is a separate event recorder, it is the same event recorder as 30A.

Figure 2:
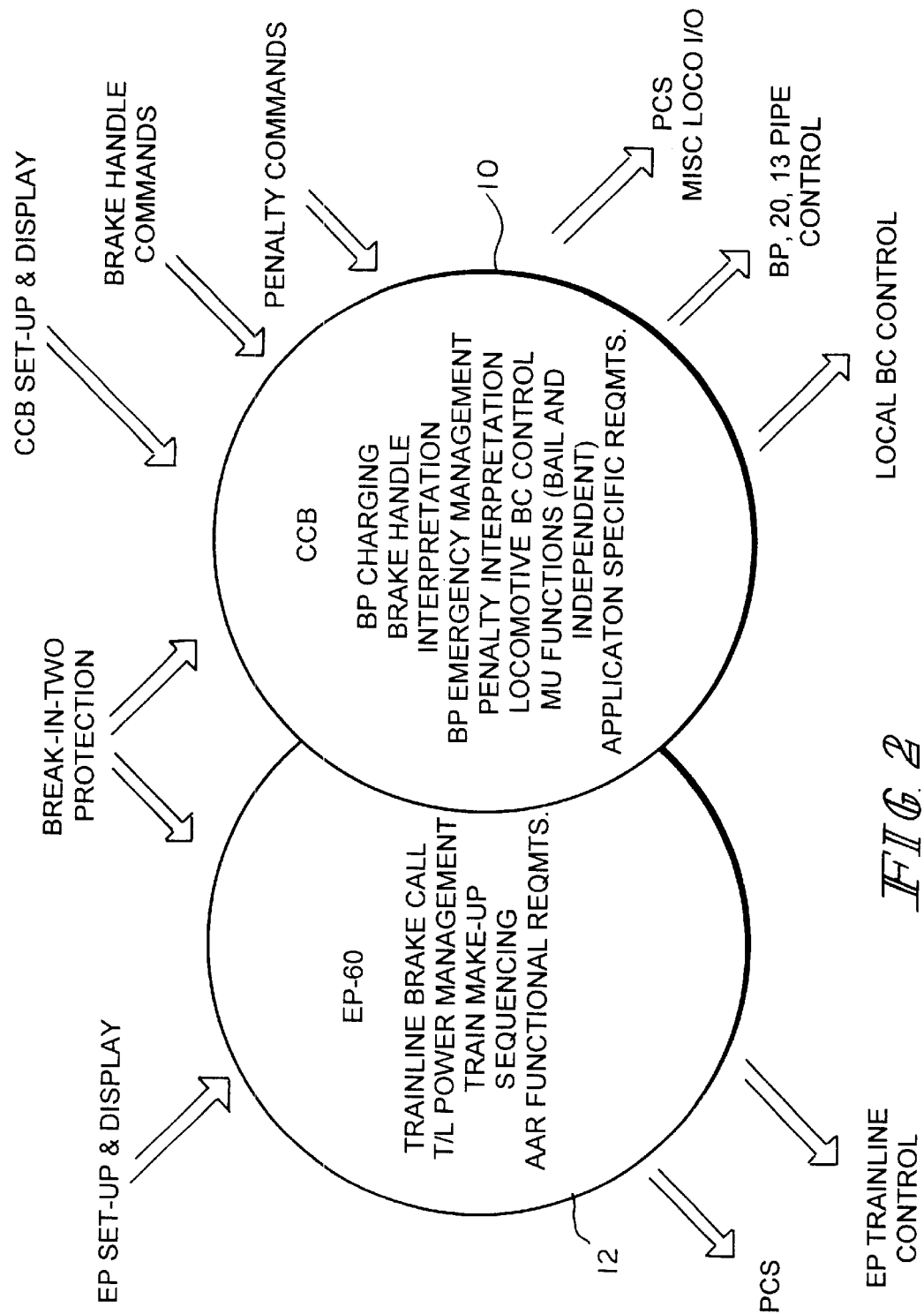
FIG. 2 is a diagram of system proportioning between the computer controlled brake system and an electropneumatic brake system.

The partitioning of the operation of the various operations performed by EP-60 and CCB is illustrated in FIG. 2. The EP-60 receives -an EP set up and display information. It provides outputs to the power cut-off switch PCS of the locomotive system as well as the EP trainline control. The EP-60 is responsible for the EP trainline brake call, trainline power management, train makeup and sequencing and AAR functional requirements.

The CCB receives inputs from the CCB set up and display, brake handle commands and penalty commands. It provides outputs to the PCS and other miscellaneous locomotive input/outputs. It also controls the brake pipe 21, the indepenent pipe (#20) 22 and the actuating pipe (#13) 28 as well as local brake cylinder controls. The CCB is responsible for brake pipe charging, brake handle interpretation, brake pipe emergency management, penalty interpretation, locomotive brake cylinder control, multi-unit operation function or MU functions (bail and independent), and application of locomotive specific requirements.

The interaction and the transfer of signals and control between EP-60 and the CCB will be explained with respect to standard or pneumatic braking and electrical braking.

Figure 3:
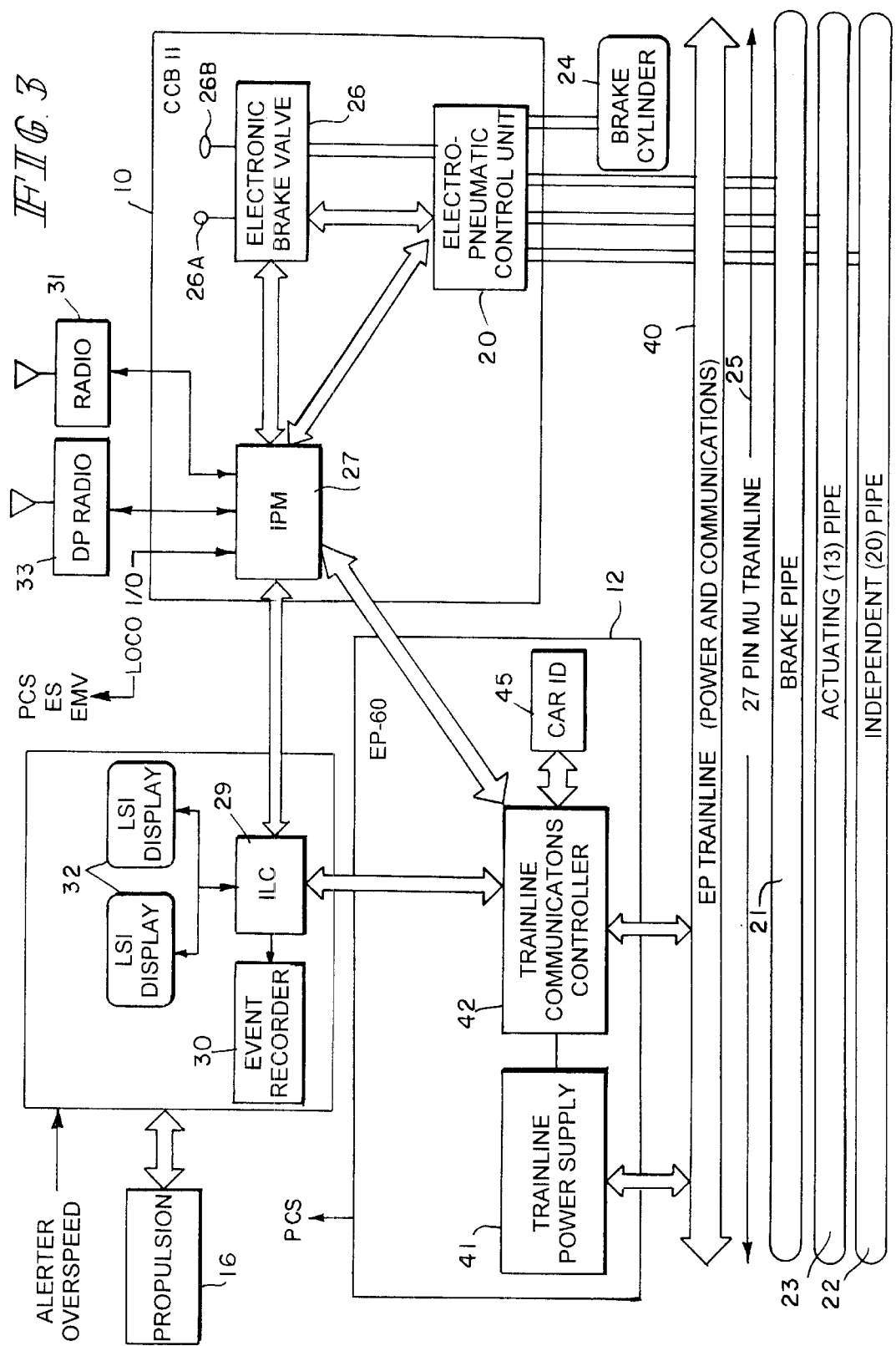
FIG. 3 is a block diagram of the integration of a computer controlled brake system and a first electropneumatic brake system for locomotive system integration application.

The computer controlled locomotive brake system 10 in FIG. 3 includes an electropneumatic control unit (EPCU) 20 responsive to input signals to control the pressure on brake pipe 21, independent application and release pipe (#20) 22 and the actuating pipe (#13) 23 and the brake cylinders 24 on its locomotive. The independent application and release pipe 22 and the actuating pipe 23 run throughout the locomotive consist and allow independent control of the locomotive brakes as distinguished from the control of the pneumatic brakes in each of the cars by the brake pipe 21 running throughout the train. Electrical communication and control of the locomotives in the consist is available over the 27-pin mu wire 25. This is generally under the control of the propulsion control system (not shown).

A computer controlled brake system 10 is shown, for example as a CCBII as shown in U.S. Pat. No. 6,098,006, and includes an integrated processor module IPM 27 which electrically controls the pneumatic control unit 20. The IPM 27 receives inputs from an electronic brake valve EBV 26 having an automatic brake handle 26A to control the brake pipe 21 and an independent brake handle 26B to control the locomotive brakes via independent pipe 22 and actuating pipe 23. The EBV 26 is an operator brake control. An integrated locomotive computer ILC 29 connects the IPM to an event recorder 30 and displays 32. The event recorder 30 may be a separate element or integral to the ILC 29. Penalties, for example Aleter and Overspeed are inputs to the ILC 29. The propulsion system 16 communicates with the ILC 29. The ILC communicates with other locomotives in its consist via MU trainline 25.

The IPM 27 is connected to locomotive systems, not shown, and exchanges a power cut-off switch signal PCS, emergency sand signal ES and emergency magnetic valve EMV. The IPM 27 may be integrated with distributed power DP 14 to communicate via radio module 33 to the other locomotives in the consist and distributed throughout the train. An end of train radio 31 communicates to the end of train device.

The connection between the IPM 27, the brake valve 26 and the electropneumatic control unit 20 is by a common bus. The suggested connection, which is an AAR standard, is a LonWork Network wherein each of the modules are a node on the neural network. The connection between the IPM 27 and the ILC 29 is a standard computer bus for example, an RS422-HDLC. The system as described so far is well known and need not be described in further detail.

The controls of an electrically controlled pneumatic brake system ECP of the prior art is illustrated as EP 60 available from New York Air Brake Corporation. The electric controlled pneumatic brakes include a train power supply TPS 41, which connects the locomotive batteries to an EP train line 40. This is an electric line that runs throughout the train and provides power and communications to EP 60 brakes on each car and if available on locomotives. A trainline communication controller TCC 42 is connected to the EP trainline 40 as a node on the neural network. A car ID node is shown as a node on the network and is part of the EP-60 system. In the prior art, the TCC 42 has no control over the pneumatic brake lines 21, 22 and 23. It only controls communication, either providing or receiving information, via the EP trainline 40. Thus, it can only communicate with other locomotives in the train which have TCC trainline controllers 42 or EP nodes on the network and connected to the EP trainline 40.

Although the EP trainline is shown as a line running through each car in the train, it is to be understood that the EP neural network may be by radio or other non-wire connection.

As implemented in the prior art, the EP brake system runs in parallel to that of the conventional pneumatic or computer control locomotive train controls. The two brake valves are provided, one being the pneumatic brake valve and the other being the EP brake valve. Similarly, separate displays are provided. The locomotive or the consist of the locomotives do not respond to the brake commands made by the EP locomotive system. Also, the EP system has its own discreet input from the event recorder 30A (FIG. 5) and locomotive controls to determine penalties.

The integrating of the computer controlled braking systems (10) with the electrical controlled pneumatic brake system (12) is achieved by interconnecting these systems as nodes on a common network as shown. The integration results in having only a single brake control valve, namely the CCB control valve 26, and eliminating the EPC control valve. Also, separate access to the event recorder 30, end of train device and a display for the TCC 42 is not required and is available from the computer control brake portion 10 in FIGS. 3–5 or directly from the ILC in FIGS. 3 and 4. Access to the penalties and other locomotive controls for the TCC 42 is also through the computer control brake system 10 in FIGS. 3–5 or directly from the ILC in FIGS. 3 and 4. Finally, the ability of the locomotive brakes to be under the electronic controlled pneumatic system TCC 42 is provided.

Figure 4:
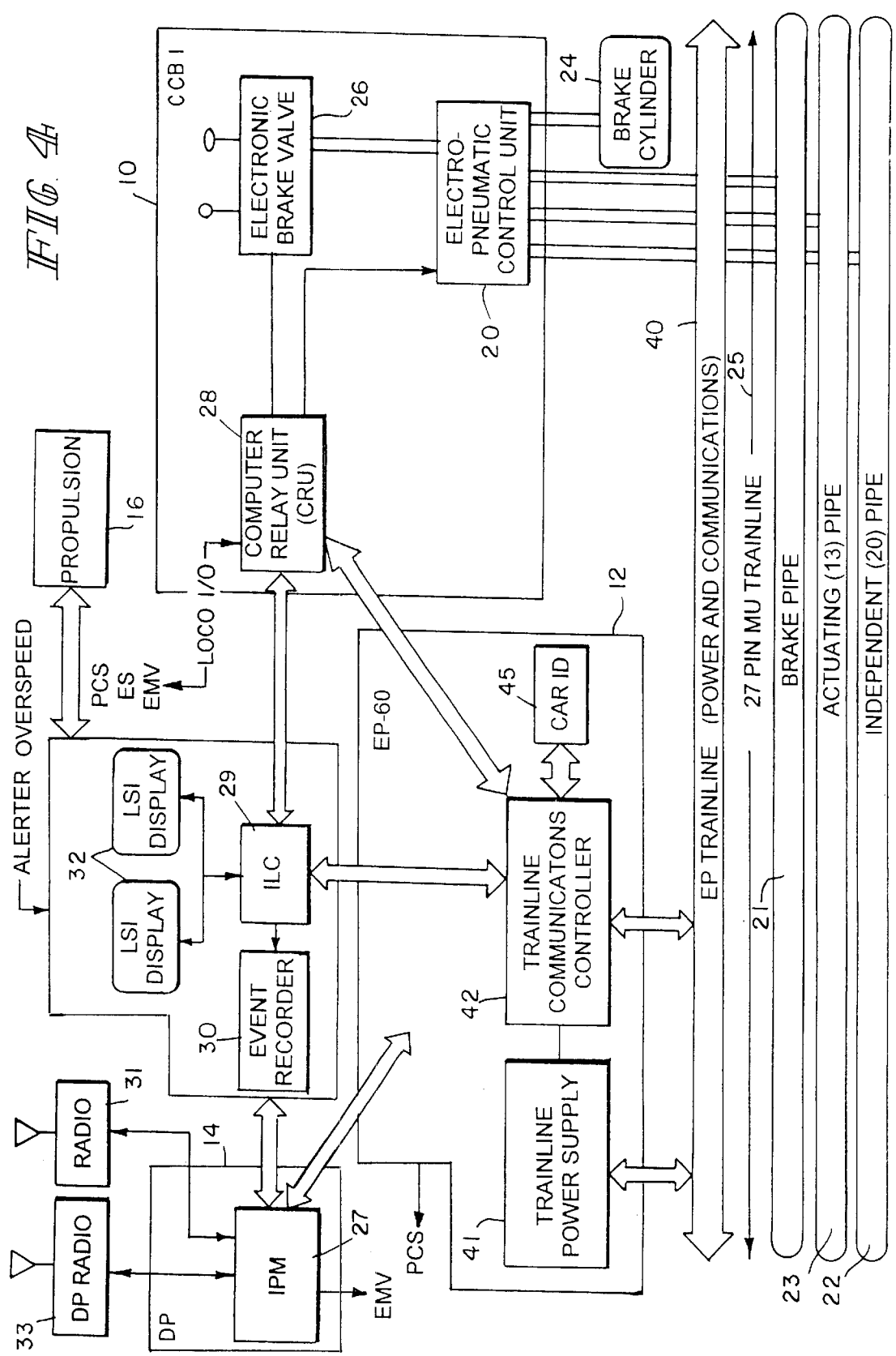
FIG. 4 is a block diagram of the integration of a computer controlled brake system and a second electropneumatic brake system for locomotive system integration application.
Figure 5:
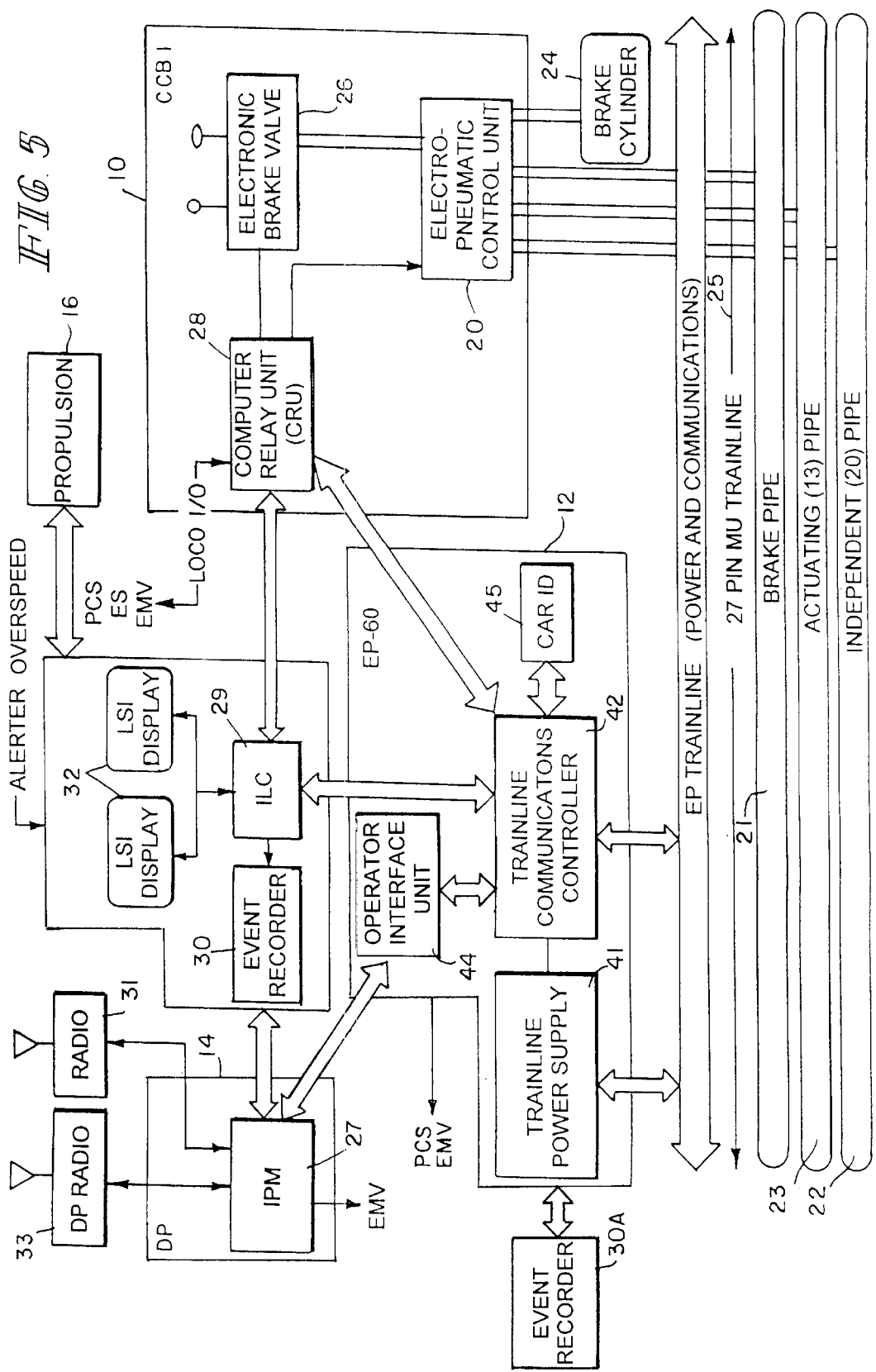
FIG. 5 is a block diagram of an alternative to FIG. 4 for non-locomotive system integration application.

As shown in FIGS. 3 and 4, the ILC 29 is directly connected by, for example, an RS 422 HDLC to the TCC 42 in locomotive system integration applications. This provides access to the event recorder 30 via the ILC 29. In FIG. 5, the TCC 42 has its own operator interface 44, has a direct connection to event recorder 30A for a non-LSI application. The connection to the event recorder 30 may be an RS 232.

An implementation of the integral system for a CCBI style control system is illustrated in FIGS. 4 and 5. An integrated system for the CCBI and EP-60 control system is illustrated in FIGS. 4 and 5. The CRU 28 is connected via electrical lines instead of communication busses to the electronic brake valve 26. The CRU 28 is connected to the TCC as a node in the communication network. The IPM 27 is a separate distributive power system DP including the DP radio 33 and the end of train EOT 31. The IPM 27 is connected as a node in the network to the TCC 42.

The train control signal from the brake valve 26 is provided to the IPM 27 and, depending upon whether IPM 27 is in the pneumatic or the electronic mode, either controls the pneumatic control unit 20 for control of brake pipe 21, or provides the brake command signals to the TCC 42 which provides electrical train or car brake signals over the EP trainline 40. The IPM 27 will not reduce the equalization reservoir ( not shown) in response to the brake valve automatic handle movements in the EP mode as it would in the pneumatic mode. This keeps the brake pipe 21 fully charged.

All locomotives equipped with EP will respond to the control signal in the EP trainline 40 to apply its brakes in response to an EP application. Simultaneously, the lead and any remote lead ECP equipped locomotive will apply the proportional pneumatic brake signal on the independent brake application and release pipe 22. The signal on this pipe will be monitored by the trailing locomotive units that do not have EP capability and will apply the locomotive brakes accordingly.

A switch or set-up process will provide an indication to the IPM controller 27 whether it should be operating in the pneumatic or the electric control mode.

The IPM 27 in combination with the EBV 26 in FIG. 3 and the CRU 28 and the 26 in FIGS. 4 and 5 form a brake controller which provides locomotive and train brake commands. TCC 42 forms a first control connected to the brake controller 27,26 and transmits a car brake signal on the network or EP trainline 40 for train brake commands. A second control, which includes control unit 20, is also connected to the brake controller 27,26 and transmits a locomotive brake signal on the locomotive brake pipe, which is an independent pipe 22, for train and locomotive brake commands. The applying and release of the locomotive brakes using the independent pipe 22 can be achieved as well as bail-off without using the actuating pipe 23 or brake pipe 21. Thus, the actuating pipe 23 may be deleted.

As previously discussed, the brake controller 27,26 has a pneumatic mode and an electrical mode. The default mode for power up and certain types of failure is the pneumatic mode. In the electrical mode, the brake controller 27,26 provides trainline brake signals on trainline 40 for the cars and locomotives that have EP brakes and are connected to the trainline 40. In the pneumatic mode, the brake controller 27,26 provides the train or car brake signals on the brake pipe 21. For both the electronic and pneumatic mode, the control unit 20 provides locomotive braking signals on the locomotive brake pipe or independent brake pipe 22.

Figure 6:
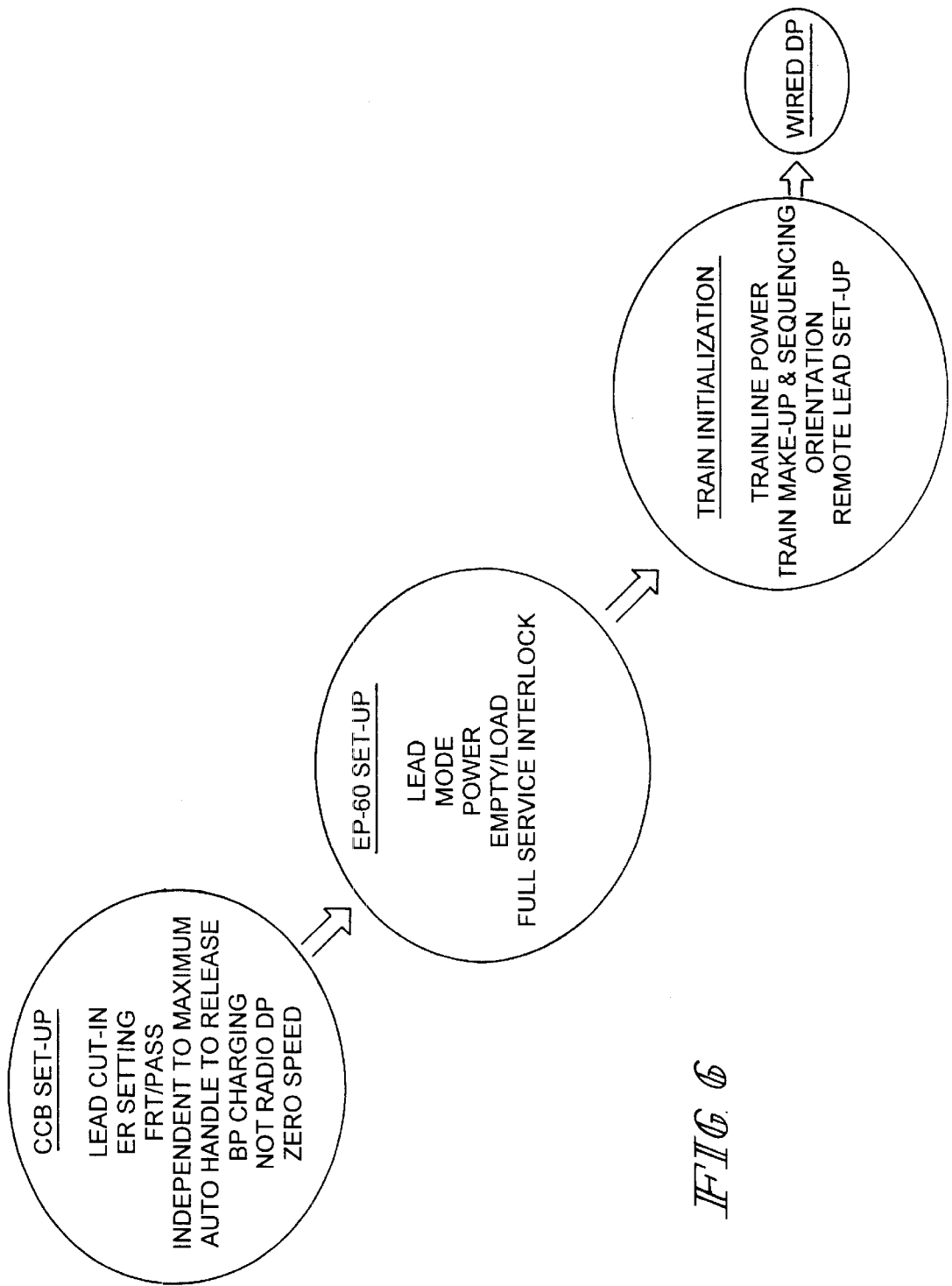
FIG. 6 is a diagram of the electric mode set up of the integrated system.

The electrical mode set up procedure is illustrated in FIG. 6. The CCB set up includes a lead cut-in and equalization reservoir setting. The system is set for freight or passenger. The independent handle is set to maximum and the automatic handle is set to release. The brake pipe is charged, the radio DP is off and the speed is set to zero.

Once these activities are complete, the CCB system will now allow transition from conventional or pneumatic mode to EP mode. From this point, the EP system can now be initialized per the standard EP procedures. Menu selection and set-up options will be provided from the ILC LSI display. For applications when the ILC to ECP interface is not available, the separately provided ECP display will provide the same.

The EP 60 set up includes entering the lead mode, powering up and determining the empty/load and full service interlock.

When the EP locomotive system set-up is complete, the EP train set-up initialization process can then be preformed. This consists of establishing or confirming the identity of all trainline devices (locomotives or cars) as well as the position and orientation of all EP equipped locomotives and cars. It also includes assignment of unique network addresses, collection of device information and downloading configuration information. During the initialization process, the Full Service Interlock is present until EP confirms that all equipment is 100% operative. After all these conditions are met, the automatic brake handle must be moved to suppression position for 10 seconds to reset the interlock. After which time, the EP brake is now fully enabled and the brake can be released.

Once EP has been enabled, Wired Distributed Power can now be selected and the remote lead locomotive setup can be preformed. All remote locomotive set-up procedures are completed from the lead locomotive. It will not be required to go to remote locomotives for set-up purposes, as is presently required for Radio Distributed Power.

Figure 7:
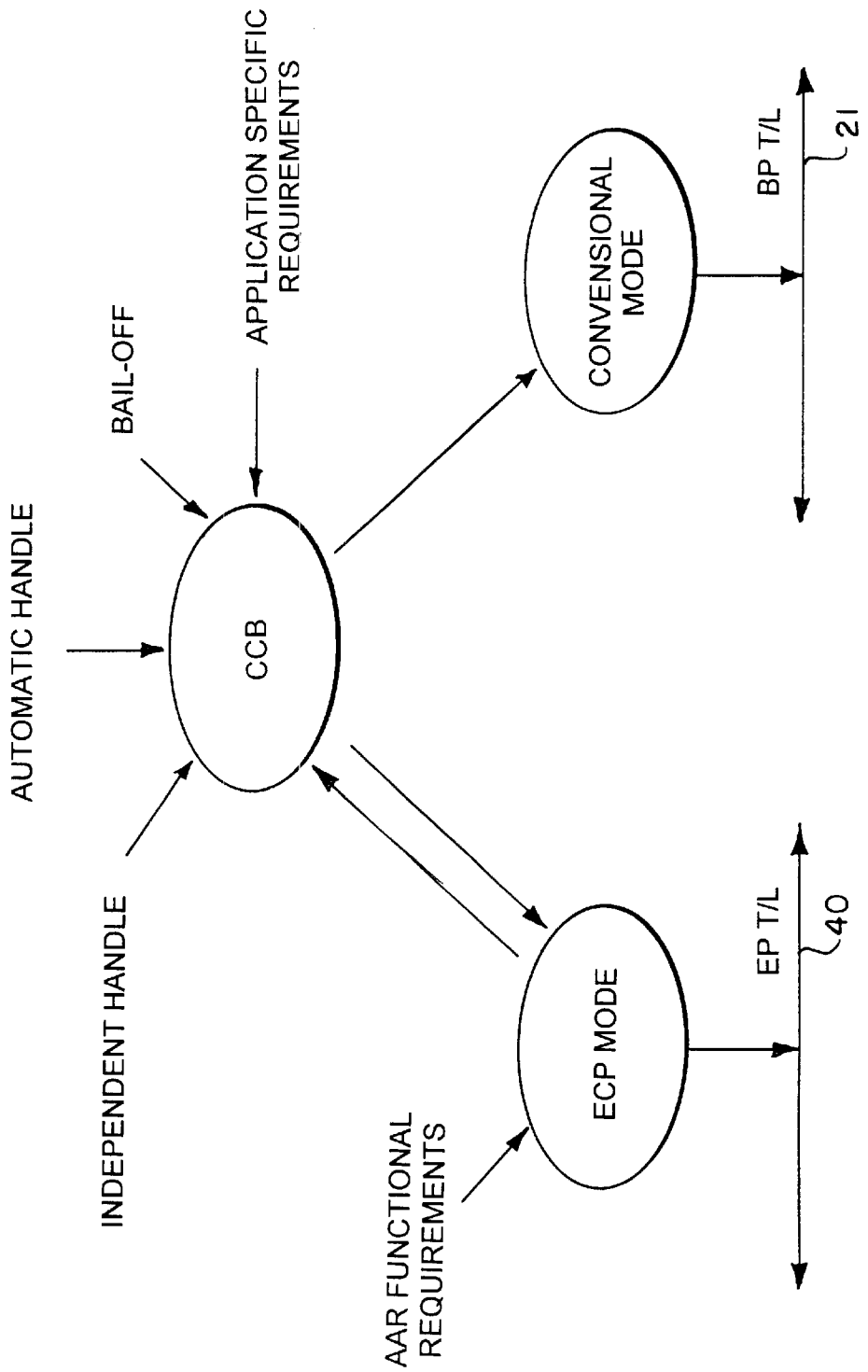
FIG. 7 is a block diagram illustrating brake valve control of the integrated system.

An overall view of the brake valve control is illustrated in FIG. 7. The EBV 26 provides an automatic handle, independent handle and bail-off inputs to the CCB which also executes application specific requirements for the locomotive. In a conventional or pneumatic mode, it controls the EP control unit 20 to control the brake pipe 21. In the electrical mode, there is communication between the TCC 42 and the CCB which controls the EP trainline 40.

In the electrical mode, the actuation of the automatic handle 26A is processed by the IPM 27 and provides train brake signals to TCC 42. TCC 42 then provides an electrical train braking signal on the EP trainline 40. It also provides back to IPM its electrical train signal, and the IPM 27 in turn provides braking commands to the EP control unit 20. The EP control unit 20 then provides an appropriate brake cylinder pressure for the brake cylinder 24 of that lead locomotive. The TCC's 42 on other remote lead locomotives provide the received train braking commands to their IPM's 27 which controls the EP control unit 20 to apply its brakes or brake cylinder 24.

The TCC 42 also, through IPM 27, commands the EP control unit 20 to apply a braking signal to the independent pipe 22. This allows pneumatic actuation of the trailing locomotives to the lead locomotive and the remote lead locomotive. This allows the consist to have non-EP equipped locomotives or the trail EP locomotives could have their electric mode cut out or disabled. Thus, in the electrical mode, the electropneumatic control unit 20 is controlled by the TCC 42 and not by the EBV 26.

Since the independent pipe 22 is used to provide pneumatic signals to trail locomotives even in the electric mode, accommodations must also be made for the operation of the independent handle 26B in the electric mode. If the independent brake handle 26B is operated in the electric mode, the EBV 26 provides a signal to the TCC through IPM 27.

The TCC 42 then provides a command back through IPM 27 to the EP control unit 20 to apply a pneumatic brake signal on the independent pipe 22. If the EP trainline 40 and the TCC 42 have the capabilities, they provide a locomotive braking signal to the EP equipped locomotives and not to the cars also connected to the EP line 40. If the automatic handle 26A and the independent handle 26B are both braking at the same time, the more restrictive braking command is used to control the locomotive brakes. Similarly, distributive power can be sent on the EP line 40 addressed to the remote lead locomotive.

Figure 8:
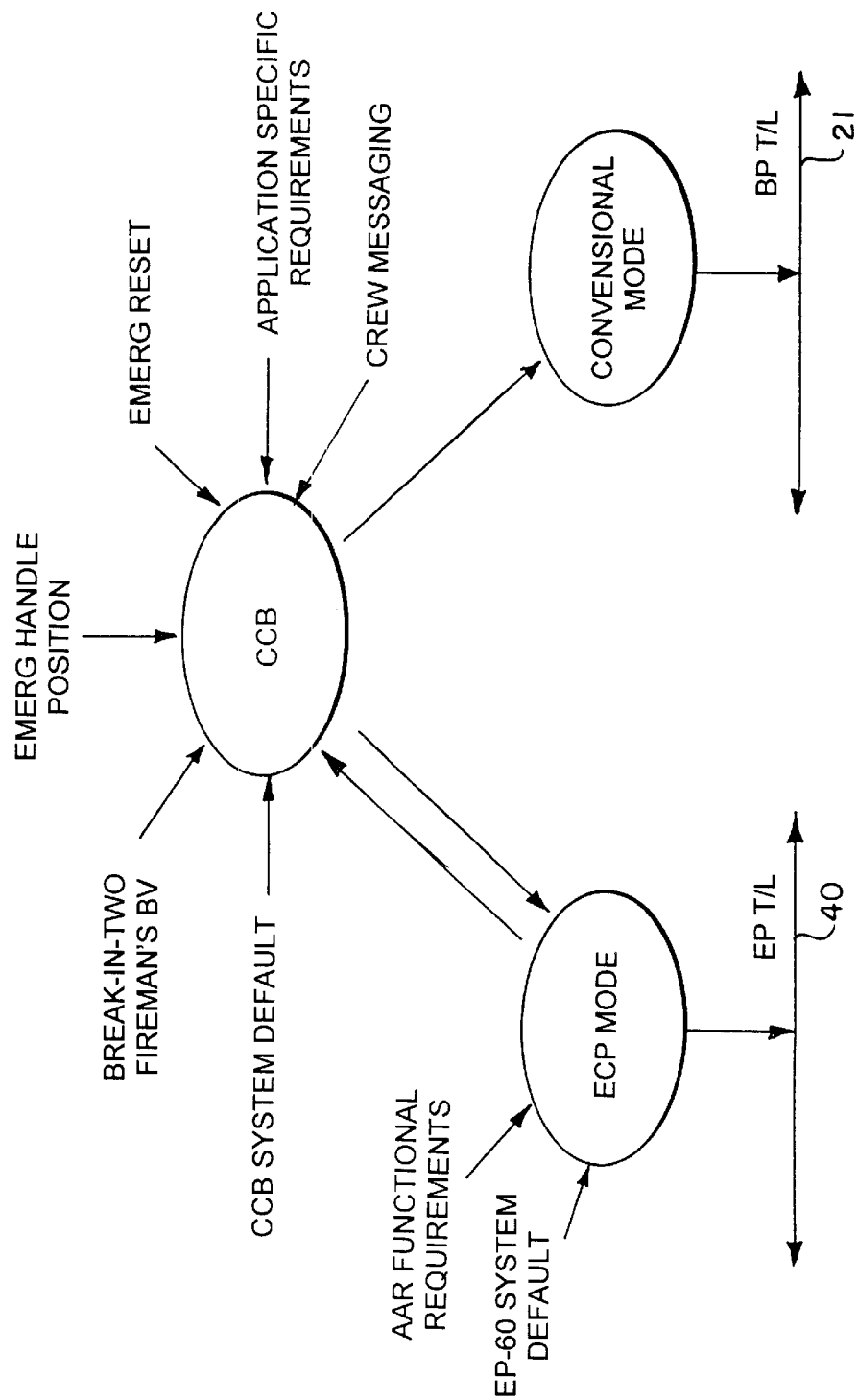
FIG. 8 is a block diagram of the electric mode emergency control of the integrated system.

The controller 27,26 can determine a system initiated emergency brake command or an operator initiated emergency brake command, as illustrated in FIG. 8. The operator initiated brake commands will come from the brake valve 26 in emergency handle positions. The system initiated brake commands include an electrical system emergency or a pneumatic system emergency. The electrical system emergencies include EP-60 system default, CCB system default and crew messaging. The pneumatic system emergencies include break-in-two and Fireman's Brake Valve.

For emergencies, the controller 27,26 provides signals to the TCC 42 which transmits an emergency brake signal on the network for system and operator initiated emergency brake commands. The controller 27,26 provides commands to the control unit 20 which transmits an emergency brake signal on the train and locomotive brake pipes 21,22 for operator initiated and pneumatic system initiated emergency brake commands. Thus, for electrical system emergency brake commands, only the EP brake is applied, while for operator and pneumatic system emergency brake commands, the EP and the pneumatic brake systems are operated. The train brake signals and the locomotive brake signals are transmitted on the trainline 40 as a percentage of brake signals.

An emergency magnetic valve EMV, under the control of TCC 42 may be provided in parallel to the EP control unit 20. If the distributive power system DP includes the emergency magnetic valve, the TCC 42 may jointly control the magnetic valve.

The TCC 42 will control electrical resetting and IPM 27 will control pneumatic resetting after an operator initiated or pneumatic system initiated emergency. The TCC 42 will control electrical resetting after an electrical system initiated emergency after the automatic handle 26A has been in full service or suppression for a fixed time before a release position can be selected.

Figure 9:
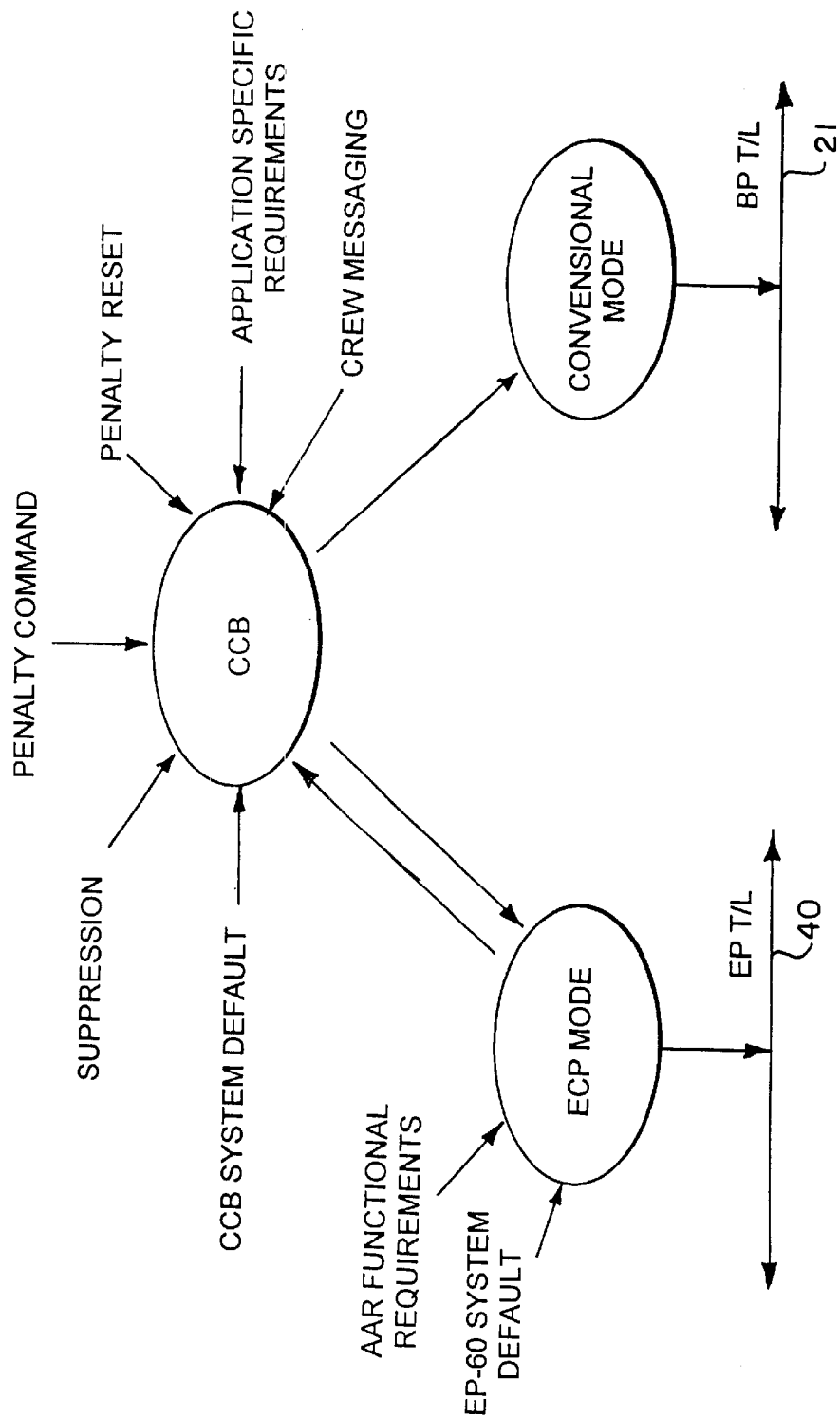
FIG. 9 is a block diagram of the penalty control of the integrated system.

The controller 27,26 provides penalty brake commands, as illustrated in FIG. 9. For these penalty brake commands in the electrical control mode, it provides penalty brake command signals to the control TCC 42 to transmit a car brake signal on the network for penalty brake commands. As with other car brake signals on the network, the brake pipe 21 is maintained charged. A penalty acknowledgment is needed from the TCC 42 to IPM 27. If it is not received, the IPM 27 will command a pneumatic emergency application using the EP control unit 20.

Controller 27 also determines whether a suppression brake command has occurred either to remove or to prevent the application of a penalty brake. This is the suppress position of the automatic brake handle of the electric brake valve 26. If the suppression brake commands occur during a penalty brake command, the controller 27,26 does not send control or brake command signals to the controller 42 or removes and interrupts any penalty application which controller 42 provides on the EP trainline 40. As is well known, the controller 27,26 provides a power cutoff signal to the locomotive propulsion system for penalty brake commands.

In prior systems, moving the automatic brake handle to the suppression position causes a brake pipe reduction which applies the train brakes. This is undesirable and avoided by the present system, which uses the suppression position only as an electric control signal and does not produce pneumatic results in the brake pipe 21.

As can be seen, in an ECP train, the brake pipe is primarily an air supply and is not used for brake controls. In the present system, the brake pipe 21 is used as a back up to allow pneumatic operation of the train brakes as well as for operator and pneumatic system initiated emergencies. With future acceptance by the industry of ECP brakes, the train brake pipe 21 and the locomotive pipes 22 and 23 may have no control functions. In an all EP train, the independent locomotive brake pipe 22 and the actuating locomotive pipe 23 will be eliminated. All signals will be sent out over the EP trainline 40. Thus, trainline braking signals will be addressed separately to cars and locomotives, and special locomotive braking signals will be addressed only to locomotives.

It should also be noted in the present system, that includes the independent brake pipe 22 with or without the actuating pipe 23, that those locomotives which have EP brakes preferably will receive their brake signal over the electric trainline 40. Those locomotives that do not have EP brakes will receive the signals pneumatically over the independent or locomotive brake pipe 22. Those locomotives which are not adjacent to the lead locomotive and not connected to other locomotives by the independent brake pipe 22 will either receive their signals by radio 33 or the remote locomotive may have EP capability and receive its signals on EP trainline 40. It may then control other adjacent locomotives on its consist pneumatically if they are connected by an independent pipe 22. Another example of a remote locomotive would be a helper locomotive which is attached at the end of the train when needed to ascend a certain grade. These locomotives would be EP equipped and would take their locomotive brake signals off the EP trainline 40. These would include automatic, independent and bail-off commands.

The brake controller 27 will power up in a conventional or pneumatic mode. In order to be switched over to the electrical mode, it must be selected as a lead locomotive and then switched over to the electric mode.

Integrating or coordinating the electrically controlled pneumatics or the ECP system through the computer control brake system, allows enhancement of safety. The computer controlled brake system can determine whether the electrical controlled pneumatics 42 are operating and if not, provide pneumatic control of the brake pipe 21 to ensure braking throughout the train. Also, by providing a single brake control valve 26 and a single display 32, the operator need not make a decision in an emergency on whether to switch from electrical controls to pneumatic controls. The operator uses a single handle and a single display and selects whether to use pneumatic or electrical controls. If the electrical controlled brakes are not operative, the system will automatically switch to pneumatic control without any other input from the operator. Thus, not only does the integration increase reliability of the two systems, but also substantially removes operator error.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A method of operating a brake system of a train which includes a train brake pipe extending through locomotives and cars in the train, a locomotive brake pipe extending through adjacent locomotives, pneumatic brakes on the locomotives connected to the locomotive brake pipe, electropneumatic brakes on the cars connected to the train brake pipe and an electrical network, and a brake controller providing brake commands, the method comprising:

determining if the brake command signal is a train brake command or a locomotive brake command;

transmitting a car brake signal on the network for train brake commands; and transmitting a locomotive brake signal on the locomotive brake pipe for train and locomotive brake commands.

2. The method according to claim 1, including determining if the brake system is in a pneumatic mode or an electrical mode; and transmitting, for train brake commands, the car brake signal on the network in the electrical mode and on the train brake pipe for the pneumatic mode.

3. The method according to claim 2, including determining if the brake command signal is a penalty brake command; and transmitting a car penalty brake signal on the network for penalty brake commands only in the electrical mode.

4. The method according to claim 3, including setting the brake system to pneumatic mode if the penalty brake signal is not transmitted on the network.

5. The method according to claim 1, including determining if the brake command signal is a system initiated emergency brake command or an operator initiated emergency brake command;

transmitting an emergency brake signal on the network for system and operator initiated emergency brake commands; and transmitting an emergency brake signal on the train and locomotive brake pipes for operator initiated emergency brake commands.

6. A method according to claim 1, including determining if the brake command signal is a pneumatic or electrical system initiated emergency brake command or an operator initiated emergency brake command;

transmitting an emergency brake signal on the network for pneumatic and electrical system and operator initiated emergency brake commands; and transmitting an emergency brake signal on the train and locomotive brake pipes for operator and pneumatic system initiated emergency brake commands.

7. The method according to claim 1, wherein at least one locomotive includes an electropneumatic brake on the electrical network; and including transmitting the locomotive brake signals on the network for train and locomotive brake commands.

8. The method according to claim 1, wherein the brake signals on the network are percentage of brake signals.

9. The method according to claim 1, including determining if the brake command signal is a penalty brake command; and transmitting a car penalty brake signal on the network for penalty brake commands.

10. The method according to claim 9, including determining if a suppression brake command occurs during a penalty brake command and not transmitting the car penalty brake signal on the network if a suppression brake command occurs during a penalty brake command.

11. The method according to claim 9, including cutting off train propulsion for a penalty brake command.

12. The method according to claim 1, including determining if the brake controller is in a lead or trail mode and determining type of brake command signals only for determined lead mode.

13. A method of operating a brake system of a train which includes a train brake pipe extending through locomotives and cars in the train, electropneumatic brakes on the locomotives connected to an electrical network, electropneumatic brakes on the cars connected to the train brake pipe and the electrical network, and a brake controller providing brake commands, the method comprising:

determining if the brake command signal is a train brake command or a locomotive brake command;

transmitting car brake signals on the network for train brake commands; and transmitting locomotive brake signals on the network for train and locomotive brake commands.

14. The method according to claim 13, wherein the brake signals on the network are percentage of brake signals.

15. The method according to claim 13, including determining if the brake command signal is a penalty brake command; and transmitting a car and locomotive penalty brake signal on the network for penalty brake commands.

16. The method according to claim 15, including determining if a suppression brake command occurs during a penalty brake command and not transmitting a car or locomotive penalty brake signal on the network if a suppression brake command occurs during a penalty brake command.

17. The method according to claim 13, including determining if the brake command signal is a system initiated emergency brake command or an operator initiated emergency brake command;

transmitting an emergency brake signal on the network for system and operator initiated emergency brake commands; and transmitting an emergency brake signal on the train brake pipe for operator initiated emergency brake commands.

18. A brake system of a train which includes a train brake pipe extending through locomotives and cars in the train, a locomotive brake pipe extending through adjacent locomotives, pneumatic brakes on the locomotives connected to the locomotive brake pipe, electropneumatic brakes on the cars connected to the train brake pipe and an electrical network, the system further comprising:

a brake controller providing locomotive and train brake commands;

a first control connected to the brake controller and transmitting a car brake signal on the network for train brake commands; and a second control connected to the brake controller and transmitting a locomotive brake signal on the locomotive brake pipe for train and locomotive brake commands.

19. The system according to claim 18, wherein the brake system has a pneumatic mode or an electrical mode;

the first control transmits the car brake signal on the network in the electrical mode; and the second control transmits the car brake signal on the train brake pipe for the pneumatic mode.

20. The system according to claim 19, wherein the brake system defaults to the pneumatic mode.

21. The system according to claim 18, wherein the controller provides a system initiated emergency brake command or an operator initiated emergency brake command;

the first control transmits an emergency brake signal on the network for system and operator initiated emergency brake commands; and the second control transmits an emergency brake signal on the train and locomotive brake pipes for operator initiated emergency brake commands.

22. The system according to claim 18, wherein the controller provides a pneumatic and electrical system initiated emergency brake command or an operator initiated emergency brake command;

the first control transmits an emergency brake signal on the network for pneumatic and electrical system and operator initiated emergency brake commands; and the second control transmits an emergency brake signal on the train and locomotive brake pipes for pneumatic system and operator initiated emergency brake commands.

23. The system according to claim 18, wherein at least one locomotive includes an electropneumatic brake on the electrical network; and the first control transmits the locomotive brake signals on the network for train and locomotive brake commands.

24. The system according to claim 18, wherein the brake controller has a lead or trail mode and provides brake command signals only in the lead mode.

25. The system according to claim 18, wherein the brake signals on the network are percentage of brake signals.

26. The system according to claim 18, wherein the controller provides a penalty brake command; and the first control transmits a car penalty brake signal on the network for penalty brake commands.

27. The system according to claim 25, wherein the controller determines if a suppression brake command occurs during a penalty brake command and does not provide a penalty brake command signal if a suppression brake command occurs during a penalty brake command.

28. The system according to claim 25, wherein the controller provides a cut-off train propulsion signal for a penalty brake command.

29. A brake system of a train which includes a train brake pipe extending through locomotives and cars in the train, electropneumatic brakes on the locomotives connected to an electrical network, electropneumatic brakes on the cars connected to the train brake pipe and the electrical network, the system further comprising:

a brake controller providing locomotive and train brake commands; and a first control connected to the brake controller and transmitting a car brake signal on the network for train brake commands and a locomotive brake signal on the network for train and locomotive brake commands.

30. The system according to claim 29, wherein the controller provides a system initiated emergency brake command or an operator initiated emergency brake command;

the first control transmits an emergency brake signal on the network for system and operator initiated emergency brake commands; and a second control connected to the controller transmits an emergency brake signal on the train brake pipe for operator initiated emergency brake commands.

31. The system according to claim 29, wherein the brake controller has a lead or trail mode and provides brake command signals only in the lead mode.

32. The system according to claim 29, wherein the train and locomotive brake signals on the network are percentage of brake signals.

33. The system according to claim 29, wherein the controller provides a penalty brake command; and the first control transmits a train penalty brake signal on the network for penalty brake commands.

34. The system according to claim 33, wherein the controller determines if a suppression brake command occurs during a penalty brake command and does not provide a penalty brake command signal if a suppression brake command occurs during a penalty brake command.

35. The system according to claim 18, including an electropneumatic valve connected to the train brake pipe and controlled by the first control to produce an emergency brake signal on the train brake pipe.

36. The method according to claim 6, including transmitting a release signal on the network for an electrical system initiated emergency if the brake controller is in a suspension before a release.

37. A method of operating a train having a distributive power system between at least a lead and remote lead locomotive, a pneumatic brake system including pneumatic brake pipe connecting electropneumatic and pneumatic brakes, and an electropneumatic brake system including an electrical network connected to the electropneumatic brakes, the method comprising:
   determining if the train is operating in a pneumatic or electropneumatic mode;
   transmitting brake signals on the pneumatic train brake pipe and power signals using a radio when the train is operating in the pneumatic mode; and
   transmitting brake signals and power signals on the electric network when the train is operating in the electrical mode.

38. The method according to claim 2, including setting the brake system to the pneumatic mode as a start-up default; performing pneumatic mode set up at start up; and performing electrical mode set up after the pneumatic mode set up if the electric mode is selected.

39. The method according to claim 38, wherein the train includes a distributive power system between at least a lead and remote lead locomotive; and performing distributive power set up after the electric mode set up.

40. The method according to claim 13, including setting the brake system to an pneumatic mode as a start-up default; performing pneumatic mode set up at start up; and performing an electrical mode set up after pneumatic mode set up if the electric mode is selected.

41. The method according to claim 40, wherein the train includes a distributive power system between at least a lead and remote lead locomotive; and performing distributive power set up after the electric mode set up.

42. The system according to claim 19, wherein the controller sets the brake system to the pneumatic mode as a start-up default; performs pneumatic mode set up at start up; and performs electrical mode set up after the pneumatic mode set up if the electric mode is selected.

43. The method according to claim 42, wherein the train includes a distributive power system between at least a lead and remote lead locomotive; and the controller performs distributive power set up after the electric mode set up.

44. The system according to claim 29, wherein the controller sets the brake system to an pneumatic mode as a start-up default; performs pneumatic mode set up at start up; and performs an electrical mode set up after pneumatic mode set up if the electric mode is selected.

45. The system according to claim 44, wherein the train includes a distributive power system between at least a lead and remote lead locomotive; and the controller performs distributive power set up after the electric mode set up.

46. The method according to claim 37, including setting the brake system to the pneumatic mode as a start-up default; performing pneumatic mode set up at start up; performing electrical mode set up after the pneumatic mode set up if the electric mode is selected; and performing distributive power set up after the electric mode set up.

47. A method of operating a train brake system having a pneumatic brake system including pneumatic train brake pipe connecting electropneumatic and pneumatic brakes, and an electropneumatic brake system including an electrical network connected to the electropneumatic brakes, the method comprising:
   setting the brake system to an pneumatic mode as a start-up default;
   performing pneumatic mode set up at start up; and
   performing an electrical mode set up after pneumatic mode set up if the electric mode is selected.

48. The method according to claim 47, wherein the train includes a distributive power system between at least a lead and remote lead locomotive; and performing distributive power set up after the electric mode set up.

49. The system according to claim 19, wherein the controller includes an operator control providing operator brake commands;
   in the electrical mode, the controller provides the operator brake commands to the first control, the first control transmits the car brake signal on the network and back to the controller, the controller provides the car brake signal to the second control, and the second control applies the brake of the locomotive and transmits the locomotive brake signal on the locomotive brake pipe; and
   in the pneumatic mode, the controller provides the operator brake commands to the second control, and the second control transmits the car brake signal on the train brake pipe and the locomotive brake signal on the locomotive brake pipe.

50. The system according to claim 29, wherein the controller includes an operator control providing operator brake commands and including a second control connected to the controller for transmitting train brake signals on the train brake pipe and applying the brake of the locomotive;
   in an electrical mode, the controller provides the operator brake commands to the first control, the first control transmits the car and locomotive brake signals on the network and the locomotive brake signal back to the controller, the controller provides the locomotive brake signal to the second control, and the second control applies the brake of the locomotive; and
   in the pneumatic mode, the controller provides the operator brake commands to the second control, and the second control transmits a train brake signal on the train brake pipe and applies the locomotive's brake for train and locomotive brake signals.

51. The system according to claim 50, wherein a non-transmitting first control upon receipt of a locomotive brake signal on the network provides the locomotive brake signal to its controller, its controller provides the locomotive brake signal to its second control, and its second control applies the brake of the locomotive.

52. The system according to claim 22, wherein the first control resets the network for pneumatic and electrical system and operator initiated emergency brake commands; and the controller resets the second control for pneumatic system and operator initiated emergency brake commands.

53. The system according to claim 26, wherein the first control acknowledges to the controller that it has transmitted a penalty brake signal and the controller sends an emergency brake command to the second control if the penalty acknowledgment is not received.

54. The system according to claim 18, including an integrated locomotive computer connected to and interfacing the controller and the first control to locomotive systems.

55. The system according to claim 54, wherein the train includes a distributive power system between at least a lead and remote lead locomotive; and the integrated locomotive computer is connected to the distributive power system.

56. The system according to claim 29, including an integrated locomotive computer connected to and interfacing the controller and the first control to locomotive systems.

57. The system according to claim 56, wherein the train includes a distributive power system between at least a lead and remote lead locomotive; and the integrated locomotive computer is connected to the distributive power system.

58. The system according to claim 29, including a second control connected to the controller for transmitting train brake signals on the train brake pipe;

including a distributive power system between at least a lead and remote lead locomotive;

wherein the second control transmits brake signals on the train brake pipe and the distributive power system transmits power signals using a radio when the train is operating in the pneumatic mode; and wherein the first control transmits brake signals and power signals on the network when the train is operating in the electrical mode.

* * * * *

UNITED STATES PATENT AND TRADEMARK OFFICE
CERTIFICATE OF CORRECTION

PATENT NO.     : 6,334,654 B1
DATED          : January 1, 2002
INVENTOR(S)    : Kevin B. Root, Bryan M. McLaughlin, Dale R. Stevens and Jon M. Marra It is certified that error appears in the above-identified patent and that said Letters Patent is hereby corrected as shown below:

<u>Title page,</u>
Item [63] Related U.S. Application Data, replace with the following:
-- Continuation-in-part of application No. PCT/US98/23766, filed on Nov. 10, 1998, and also a continuation-in-part of application No. 09/254,638, filed on Nov. 23, 1999, now Pat. No. 6,098,006. --

Signed and Sealed this

Thirty-first Day of December, 2002

JAMES E. ROGAN
*Director of the United States Patent and Trademark Office*

UNITED STATES PATENT AND TRADEMARK OFFICE
Certificate

Patent No. 6,334,654                                                 Patented: January 1, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Kevin B. Root, Black River, N.Y.; Bryan M. McLaughlin, Watertown, N.Y.; Dale R. Stevens, Adams Center, N.Y.; Jon M. Marra, Henderson, N.Y.; and John J. Allen, Watertown, N.Y.

Signed and Sealed this Fourteenth day of January 2003.

JACK W. LAVINDER
*Supervisory Patent Examiner*
Art Unit 3683